(12) United States Patent
Watanabe et al.

(10) Patent No.: US 7,487,514 B1
(45) Date of Patent: Feb. 3, 2009

(54) METHOD AND SYSTEM FOR USING DLPI TO NEGOTIATE ADVANCED INTERFACES

(75) Inventors: Yuzo Watanabe, San Francisco, CA (US); Sunay Tripathi, San Jose, CA (US); Paul Durrant, Slough (GB)

(73) Assignee: Sun Microsystems, Inc., Santa Clara, CA (US)

( * ) Notice: Subject to any disclaimer, the term of this patent is extended or adjusted under 35 U.S.C. 154(b) by 877 days.

(21) Appl. No.: 10/931,145

(22) Filed: Aug. 31, 2004

(51) Int. Cl.
*G06F 9/44* (2006.01)
(52) U.S. Cl. ...................................... 719/321; 719/327
(58) Field of Classification Search ................. 719/321, 719/327, 328; 709/238, 250, 224; 713/100; 710/15
See application file for complete search history.

(56) References Cited

U.S. PATENT DOCUMENTS

| | | | | |
|---|---|---|---|---|
| 6,141,705 A * | 10/2000 | Anand et al. | ................... | 710/15 |
| 6,801,948 B2 * | 10/2004 | Clark et al. | ................. | 709/231 |
| 6,816,275 B1 * | 11/2004 | Aoki | ......................... | 358/1.15 |
| 6,904,519 B2 * | 6/2005 | Anand et al. | ................. | 713/100 |
| 7,032,243 B2 * | 4/2006 | Leerssen et al. | ............... | 726/17 |
| 2001/0023449 A1 * | 9/2001 | Clark et al. | .................. | 709/231 |
| 2002/0062333 A1 * | 5/2002 | Anand et al. | ................. | 709/105 |
| 2003/0212784 A1 * | 11/2003 | Nguyen | ...................... | 709/224 |
| 2005/0046896 A1 * | 3/2005 | Aoki | ......................... | 358/1.15 |

* cited by examiner

*Primary Examiner*—Van H Nguyen
(74) *Attorney, Agent, or Firm*—Osha•Liang LLP

(57) ABSTRACT

A method for obtaining a capability of a network interface card (NIC). The method includes sending a first data link provider interface (DLPI) request to the NIC and sending a DLPI acknowledgement to an operating system, where the DLPI acknowledgement includes the capability of the NIC. The method further includes enabling the capability on the operating system and establishing a direct communication channel between the NIC and the operating system using the capability.

11 Claims, 4 Drawing Sheets

METHOD AND SYSTEM FOR USING DLPI TO NEGOTIATE ADVANCED INTERFACES

BACKGROUND

Network interface cards (NICs) are used to connect a system (i.e., a computer system) to a network. Typically, different types of NICs are used to connect a computer system to specific types of networks and protocols (e.g., Ethernet, Token Ring, etc.). The NIC typically communicates using NIC drivers (i.e., network drivers), which are software interfaces between the NIC and the operating system data link layer.

Conventionally, NIC drivers are written using the Data Link Provider Interface (DLPI) specification. The DLPI provides a set of instructions and commands that the NIC driver may use to specify functions and features offered by the NIC. The DLPI may be used, for example, to specify data being sent or instructions to set particular options between two system components. For example, typically, when a new NIC is introduced into a system, the NIC driver and the operating system (OS) communicate via DLPI. The NIC driver sends data from the NIC to the OS using DLPI capability negotiation. Conventionally, capability negotiation is used to inform the OS which features the NIC supports, describes the features, and may provide some options available to use the features (e.g., hardware checksum, zero-copy-support, etc.).

Today, NICs are incorporating new technologies at a rapid pace, and many of these advanced features and functionalities require advanced interfaces between the operating system and the NIC in order to allow the operating system to be aware of and make use of these new features.

SUMMARY

In general, in one aspect, the invention relates to a method for obtaining a capability of a network interface card (NIC) comprising sending a first data link provider interface (DLPI) request to the NIC, sending a DLPI acknowledgement to an operating system, wherein the DLPI acknowledgement comprises the capability of the NIC, enabling the capability on the operating system, establishing a direct communication channel between the NIC and the operating system using the capability.

In general, in one aspect, the invention relates to a system, comprising a network interface card (NIC), a NIC driver interfacing with the NIC configured to store a capability of the NIC, and a data link provider interface configured to interface the NIC driver with an operating system, wherein the operating system configured to request the list of capabilities from the NIC driver, receive the list of capabilities, enable the capability, and establish a direct communication channel between the operating system and the NIC driver using the at least one capability.

In general, in one aspect, the invention relates to a computer system for obtaining a capability of a network interface card (NIC), comprising a processor, a memory, a storage device, and software instructions stored in the memory for enabling the computer system under control of the processor, to send a first data link provider interface (DLPI) request to the NIC, send a DLPI acknowledgement to an operating system, wherein the DLPI acknowledgement comprises the capability of the NIC, enable the capability on the operating system, establish a direct communication channel between the NIC and the operating system using the capability.

In general, in one aspect, the invention relates to a plurality of nodes, comprising a network interface card (NIC), a NIC driver interfacing with the NIC configured to store a capability of the NIC, and a data link provider interface configured to interface the NIC driver with an operating system, wherein the operating system configured to request the list of capabilities from the NIC driver, receive the list of capabilities, enable the capability, and establish a direct communication channel between the operating system and the NIC driver using the at least one capability, wherein the NIC resides on one of the plurality of nodes, wherein the NIC driver resides on one of the plurality of nodes, and wherein the operating system resides on one of the plurality of nodes.

Other aspects of the invention will be apparent from the following description and the appended claims.

DETAILED DESCRIPTION

Figure 1:
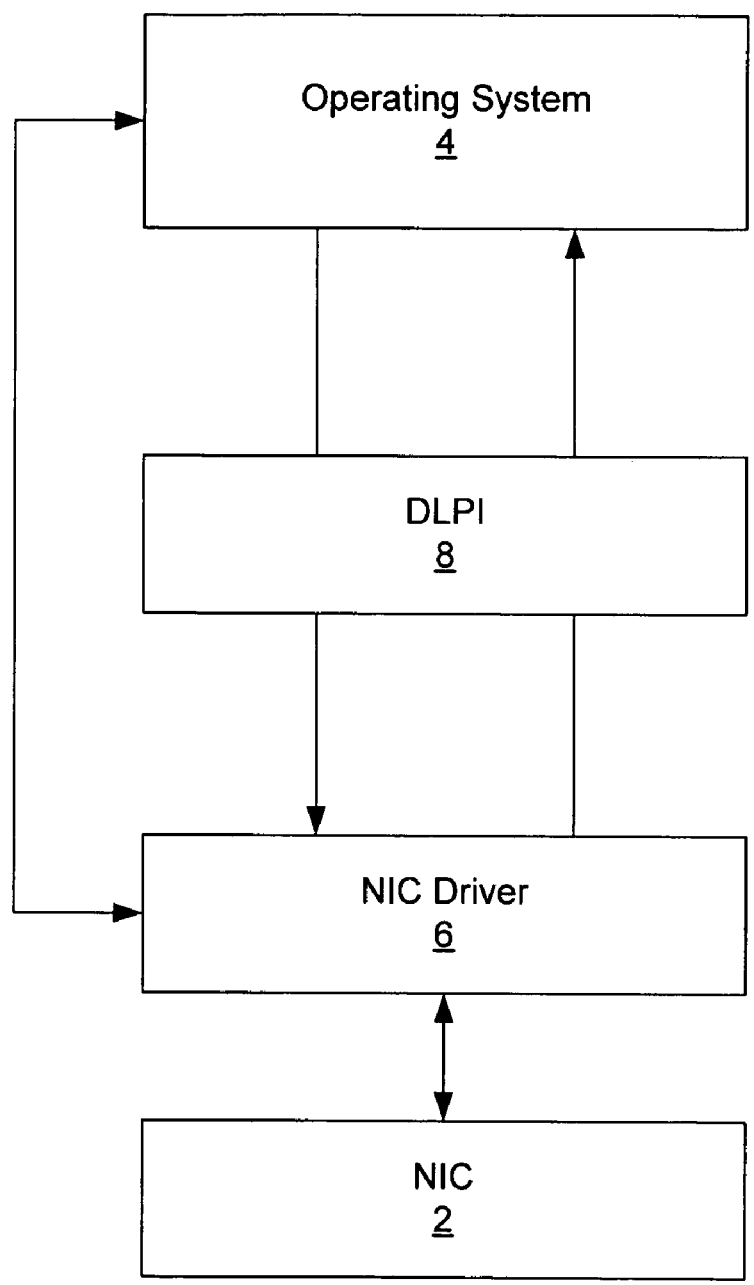
FIG. 1 shows a system in accordance with an embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to using the data link provider interface (DLPI) and negotiation of capabilities supported by a network interface card (NIC) to allow direct communication between the NIC and an operating system (OS). More specifically, embodiments of the invention relate to notifying the OS of new features available in a NIC and providing the particular interfaces for using the features to the OS using the DLPI. Further, one or more embodiments of the invention allows the OS to decide whether to enable each of the features supported by the NIC.

FIG. 1 shows a system in accordance with one embodiment of the invention. Typically, when a NIC (2) is introduced into a system (i.e., brought online), the NIC (2) may be capable of advanced features (i.e., capabilities) that are unknown to the OS (4). For example, features available in advanced NICs may include TCP offload engines (TOE), dynamic polling, etc. In one embodiment of the invention, the NIC (2) interfaces with a NIC driver (6). The NIC driver (6) is the software interface between the NIC (2) and the OS (4). In order for the NIC driver (6) and the OS (4) to communicate, the NIC driver (6) uses the data link provider interface (DLPI) (8). As noted above, the DLPI (8) defines the services offered by a provider and provides a method for sending data between the NIC (2) and the OS (4). Therefore, the DLPI (8) allows the NIC driver (6) to inform the OS (4) of the features offered by the NIC (2). Those skilled in the art will appreciate that while FIG. 1 illustrates a NIC (2) as the hardware interfacing with the OS (4), the invention may be performed using any other hardware that is capable of offering services and features to the OS (4).

Continuing with FIG. 1, as mentioned above, the features available through the NIC (2) are initially unknown to the OS (4). Therefore, the OS (4) may send a request to the NIC driver (6) in order to obtain the various features and capabilities supported by the NIC (2). In one embodiment of the invention, the OS (4) sends a request to the NIC driver (6) using a DLPI request (described below in FIG. 2). Subsequently, the NIC driver (6) responds to the OS (4) with data regarding the features supported by the NIC (2) using a DLPI acknowledgement (described below in FIG. 3). In one embodiment of the invention, the DLPI acknowledgement includes a list of capabilities available to the OS (i.e., a list of features supported by the NIC (2)).

Further, in one embodiment of the invention, the DLPI acknowledgement includes interfaces that provide a method for direct communication between the NIC driver (6) and the OS (4). More specifically, the interfaces associated with the features supported by the NIC (2) that are sent by the DLPI acknowledgement provide specific parameters and function pointers (i.e., function pointers that are associated with a new function written for a specific capability of the NIC). In one embodiment of the invention, the OS (4) may use these function pointers to obtain data from the NIC (2) instead of using the functions and methods of communication specified by the DLPI (8). Therefore, the interfaces provided by the NIC driver (6) allow the OS (4) to directly communicate, modify, and use the features supported by the NIC (2). As a result, the OS (4) may bypass the DLPI (8) layer.

Figure 2:
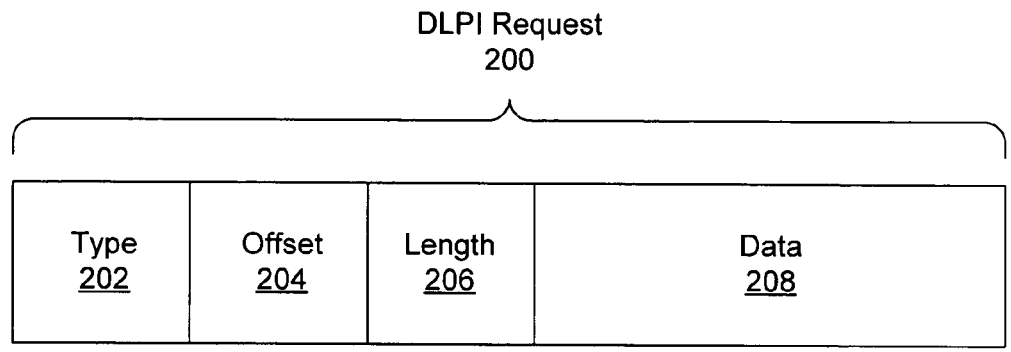
FIG. 2 shows a DLPI request in accordance with one embodiment of the invention.

FIG. 2 shows a DLPI request (200) in accordance with one embodiment of the invention. As noted above, the DLPI request (200) is sent as a probe to the NIC driver in order to query the NIC driver for all the capabilities supported by the NIC. In one embodiment of the invention, the DLPI request (200) includes parameters such as type (202), offset (204), length (206), and the actual data of the message (208). The 'length' parameter (206) specifies the length of the message sent by the OS. The 'offset' parameter (204) specifies at which offset the actual data begins. The 'type' parameter (202) specifies the type of DLPI message being sent (e.g., a capability request, an acknowledgement, etc.). In the case of a DLPI request (200), the 'type' parameter (202) specifies a 'request.' Additionally, the data (208) included in the request may be any data that the OS sends to the NIC driver.

Figure 3:
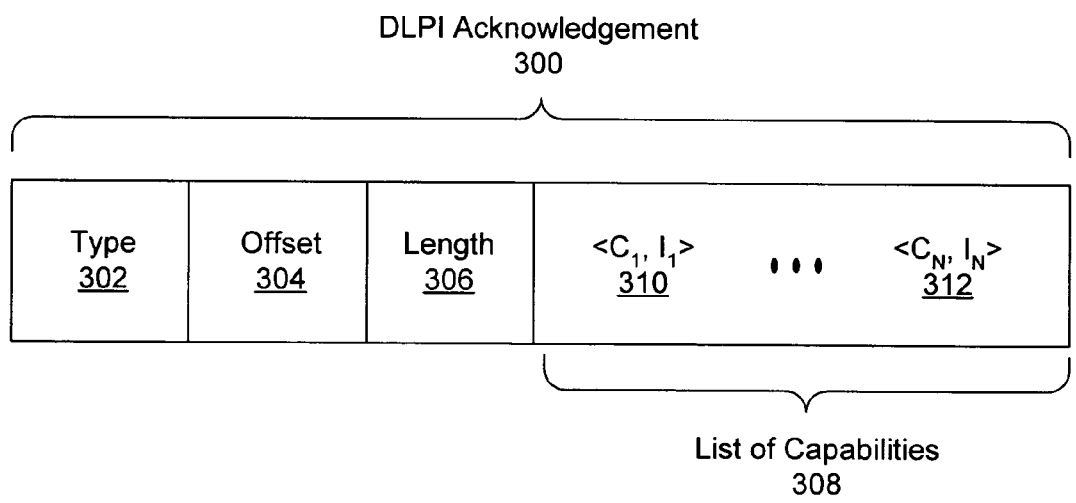
FIG. 3 shows a DLPI acknowledgement in accordance with one embodiment of the invention.

FIG. 3 shows a DLPI acknowledgement (300) in accordance with one embodiment of the invention. In one embodiment of the invention, the DLPI acknowledgement (300) includes the aforementioned parameters (i.e., type (302), offset (304), and length (306)) identifying the DLPI acknowledgement (300), and specifies details regarding the capabilities offered by the NIC. In one embodiment of the invention, in the DLPI acknowledgement (300) the 'type' parameter (302) is specified as an 'acknowledgement.' Further, the DLPI acknowledgement (300) includes a list of capabilities (308) offered by the NIC. In one embodiment of the invention, the list of capabilities (308) is parsed and stored by the OS using the offset (304) and the length (306) parameters in the DLPI acknowledgement (300).

In one embodiment of the invention, the DLPI acknowledgement also provides the interfaces associated with each capability in the list of capabilities (308). For example, as shown in FIG. 3, each capability includes an associated interface (i.e., $<C_1, I_1>$ (110), $<C_N, I_N>$ (112), where $C_1$ represents a capability and $I_1$ represents the associated interface). Further, in one embodiment of the invention, a particular interface (e.g., $I_1, I_N$) may include the function calls to use/modify the capability, a method to turn on or turn off the capability, etc. Those skilled in the art will appreciate that the list of capabilities, interfaces, and the parameters of the DLPI request and the DLPI acknowledgement may be organized in several ways. For example, the data following each capability (i.e., corresponding interfaces) may be communicated in a programming construct (e.g., a "struct" in C), etc.

Additionally, in one embodiment of the invention, the organization of the list of capabilities and the corresponding interfaces allows the OS to know how to cast the capability. For example, consider the scenario where the feature advertised to the OS by the NIC driver is dynamic polling. Dynamic polling allows the OS to modify the interrupt blanking period for receiving packets. In this case, the DLPI request sent by the OS initially specifies only the type parameter (i.e., DL_CAPABILITY_REQ). Subsequently, the NIC driver responds to the OS using a DLPI acknowledgment. In this case, the DLPI acknowledgement may specify the type as a DL_CAPABILITY_ACK, the length of the message, and the offset at which the data begins. In the list of capabilities, the DLPI acknowledgement may specify the function that is being advertised (e.g., dynamic polling) in the form of a function call (e.g., dl_capab_poll_s). Further, the interfaces for using the dynamic polling feature may be provided in the function call, for example, poll_notification_off and poll_notification_on are commands that may be used by the OS to turn interrupt blanking off and on. In one embodiment of the invention, the OS stores these interfaces in its own structures (i.e., any data structure) and may call these functions at any later time to turn on or turn off interrupt blanking.

Figure 4:
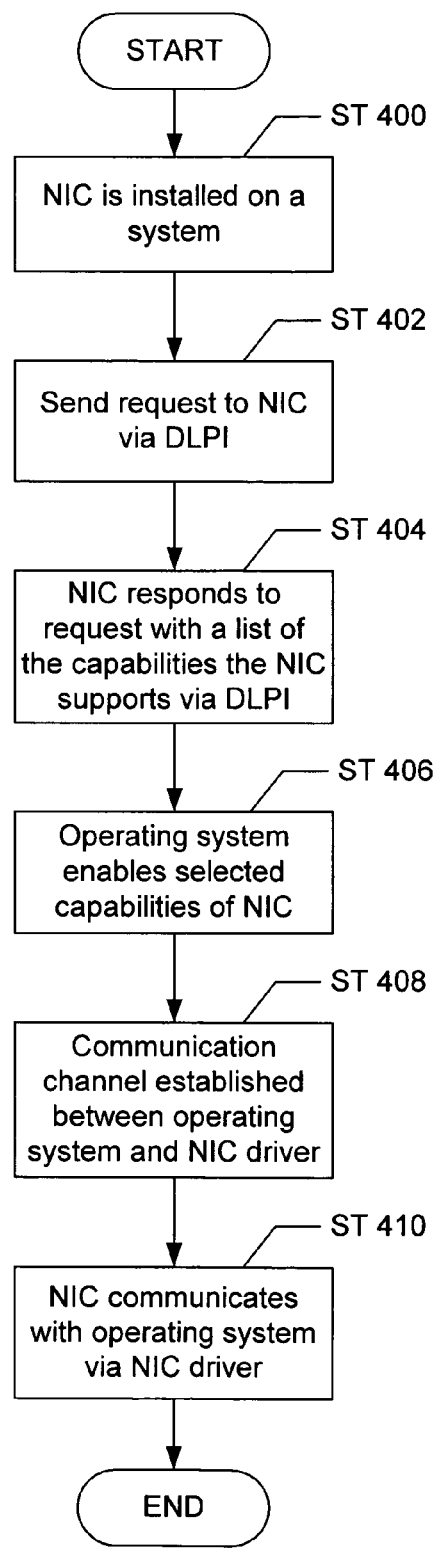
FIG. 4 shows a flow chart for negotiating between a network interface card and an operating system in accordance with an embodiment of the invention.
Figure 5:
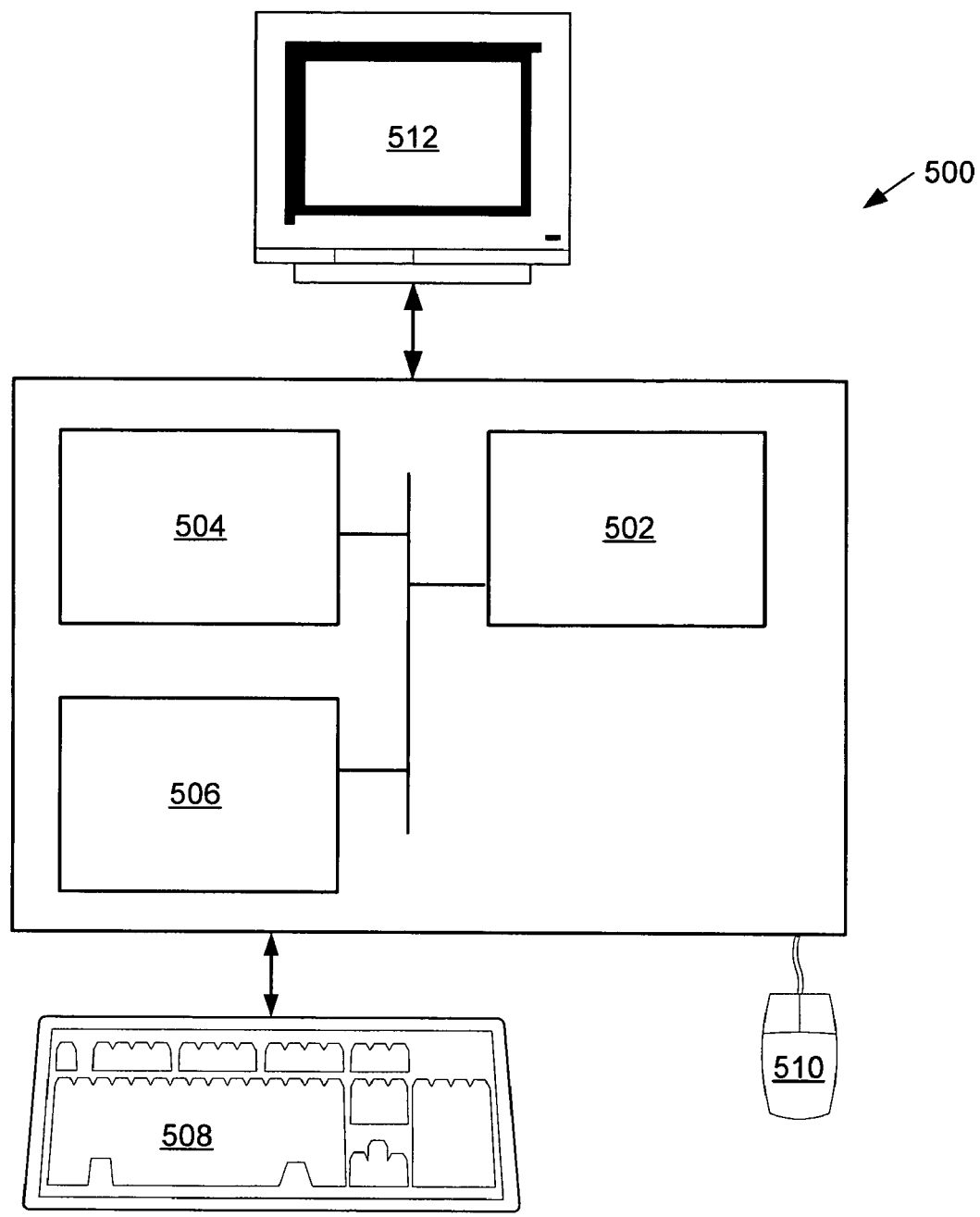
FIG. 5 shows a computer system in accordance with an embodiment of the invention.

FIG. 4 shows a flow chart for negotiating features between a NIC and an OS in accordance with one embodiment of the invention. Initially, the NIC is installed on a system (Step 400). At this point, the NIC is brought online on the system in which the NIC is installed. Subsequently, a request is sent by the OS to the NIC via the DLPI (Step 402). More specifically, the request is sent to the NIC driver. The DLPI request sent by the OS includes the parameters (i.e., type, offset, and length shown in FIG. 2). In one embodiment of the invention, when sending the DLPI request, the OS fills in only the 'type' parameter. Therefore, the offset and length parameters are initially left blank. In one embodiment of the invention, the OS specifies that the 'type' is a DL_CAPABILITY_REQ. The DL_CAPABILITY_REQ indicates to the NIC driver that the OS is requesting the different capabilities that the NIC driver supports (e.g., interrupt blanking, TCP offload engine, etc.).

At this point, the NIC driver responds to the DLPI request with a DLPI acknowledgment (Step 404). In one embodiment of the invention, the DLPI acknowledgement sent to the OS by the NIC driver includes the same parameters (i.e., type, offset, and length). In addition, in one embodiment of the invention, the DLPI acknowledgement includes a list of the capabilities offered by the NIC. The list of capabilities may also include interfaces for using the capabilities. In one embodiment of the invention, the interfaces provide methods for the OS to query, modify, input, and use the capability offered by the NIC driver. Further, in one embodiment of the invention, when the NIC driver forms the DLPI acknowledgement, the 'type' parameter is specified as DL_CAPABILITY_ACK. The offset and length parameters are specified by the NIC driver as the length of the data following the parameters, and the offset at which the data begins. This configuration allows the OS to traverse to the exact location of the list of capabilities in order to begin copying the various capabilities and associated interfaces supported by the NIC.

Continuing with FIG. 4, once the NIC sends the DLPI acknowledgement to the OS and the OS copies the necessary capabilities, the OS may choose to enable all, some, or none of the capabilities specified in the list of capabilities via the DLPI acknowledgement (Step 406). In one embodiment of the invention, the OS enables one or more capabilities by sending another DLPI request to the NIC driver. This subsequent DLPI request includes the same parameters as described above; however, the offset and length fields may be specified in this subsequent DLPI request (recall that the initial DLPI request only has the 'type' parameter specified). Further, the subsequent DLPI request may include new OS interfaces that the NIC driver may use to interact directly with the OS.

In one embodiment of the invention, the capabilities enabled by the OS are stored in the OS and may be used at a later time. However, the capabilities that are not enabled by the OS may not be subsequently used. In one embodiment of the invention, if the NIC is re-booted or brought online at a later point in time, the OS may send another DLPI request to the NIC driver in order to enable newer capabilities or capabilities that were not initially enabled.

Next, a communication channel is established between the OS and the NIC driver (Step 408). In one embodiment of the invention, the communication channel is a direct link between the OS and the NIC driver. In other words, the OS and the NIC driver may now use the interfaces provided in the DLPI acknowledgement to directly communicate without using the DLPI. Once the NIC driver and OS are directly linked, the NIC is capable of communicating with the OS via the NIC driver (Step 410) and the process ends.

Embodiments of the invention may be implemented on virtually any type of computer regardless of the platform being used. For example, as shown in FIG. 4, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (WAN) via a network interface connection (not shown). Those skilled in the art will appreciate that these input and output means may take other forms. Further, those skilled in the art will appreciate that one or more elements of the aforementioned computer (500) may be located at a remote location and connected to the other elements over a network.

Further, those skilled in the art will appreciate that one or more elements of the aforementioned computer (500) may be located at a remote location and connected to the other elements over a network. Further, embodiments of the invention may be implemented on a distributed system having a plurality of nodes, where each portion of the invention (i.e., NIC, OS, etc.) may be located on a different node within the distributed system. In one embodiment of the invention, the node corresponds to a computer system.

Embodiments of the invention provide a method to notify the OS of new features supported by a NIC. One or more embodiments of the invention allow more complex interactions using direct interfaces between a NIC and the OS by establishing a direct communication channel between the NIC driver and the OS. Further, the NIC driver provides direct interfaces to the OS, which enables performance enhancements due to the elimination of a layer of communication between the NIC driver and the OS (i.e., the DLPI).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining a capability of a network interface card (NIC) comprising:
    sending a first data link provider interface (DLPI) request for the NIC to a DLPI, wherein the first DLPI request comprises a query for a capability of the NIC;
    sending the first DLPI request from the DLPI to a NIC driver associated with the NIC;
    determining, in response to the first DLPI request, the capability of the NIC;
    sending a DLPI acknowledgement to the DLPI from the NIC driver;
    sending the DLPI acknowledgement from the DLPI to an operating system, wherein the DLPI acknowledgement comprises the capability of the NIC;
    establishing, in response to the DLPI acknowledgment, a direct communication channel between the NIC driver and the operating system, wherein the direct communication channel bypasses the DLPI; and
    enabling the operating system, through the direct communication channel, to utilize the capability of the NIC,
    wherein enabling the operating system through the direct communication channel, to utilize the capability of the NIC comprises sending a second DLPI request to the NIC driver associated with the NIC,
    wherein the DLPI acknowledgement comprises at least one interface associated with the capability, and
    wherein the operating system is configured to use the capability through a function pointer provided in the interface.

2. The method of claim 1, wherein the first DLPI request comprises a type, an offset and a length.

3. The method of claim 1, wherein the DLPI acknowledgement comprises a type, an offset, a length, and the capability.

4. The method of claim 1, wherein the second DLPI request comprises a type, an offset, and a length.

5. The method of claim 1, wherein the NIC is configured to use an OS interface through a function pointer.

6. A system, comprising:
    a network interface card (NIC), wherein the NIC comprises a capability;
    a NIC driver interfacing with the NIC, wherein the NIC driver is configured to store the capability of the NIC; and
    a data link provider interface (DLPI) configured to interface the NIC driver with an operating system,
    wherein the operating system is configured to:
        request the capability of the NIC from the NIC driver using the DLPI,
        receive a DLPI acknowledgement of the capability of the NIC from the NIC driver, wherein the acknowledgement is routed through the DLPI,
        enable the capability of the NIC, and
        establish, in response to the DLPI acknowledgement, a direct communication channel between the operating system and the NIC driver to use the capability of the NIC, wherein the direct communication channel bypasses the DLPI,
    wherein the operating system requests the capability of the NIC using a first DLPI request, wherein enabling the operating system, through the direct communication channel, to use the capability of the NIC comprises sending a second DLPI request to the NIC driver associated with the NIC,
wherein the DLPI acknowledgement comprises at least one interface associated with the capability, and
wherein the operating system is configured to use the capability through a function pointer provided in the interface.

7. The system of claim 6, wherein the DLPI acknowledgement comprises a type, an offset a length, and the capability.

8. The system of claim 6, wherein the first DLPI request comprises a type, an offset, and a length.

9. The system of claim 6, wherein the second DLPI request comprises a type, an offset, a length, and an optional interface associated with the operating system.

10. A computer system for obtaining a capability of a network interface card (NIC), comprising:
a processor;
a memory;
a storage device; and
software instructions stored in the memory for enabling the computer system under control of the processor, to:
send a first data link provider interface (DLPI) request for the NIC to a data link provider interface (DLPI), wherein the first DLPI request comprises a query for a capability of the NIC;
send the first DLPI request from the DLPI to a NIC driver associated with the NIC;
determine, in response to the first DLPI request, the capability of the NIC;
send a DLPI acknowledgement to the DLPI from the NIC driver;
send the DLPI acknowledgement from the DLPI to an operating system,
wherein the DLPI acknowledgement comprises the capability of the NIC;
establish, in response to the DLPI acknowledgement, a direct communication channel between the NIC driver and the operating system, wherein the direct communication channel bypasses the DLPI; and
enable the operating system, through the direct communication channel, to utilize the capability of the NIC,
wherein enabling the operating system, through the direct communication channel, to utilize the capability of the NIC comprises sending a second DLPI request to the NIC driver associated with the NIC,
wherein the DLPI acknowledgement comprises at least one interface associated with the capability, and
wherein the operating system is configured to use the capability through a function pointer provided in the interface.

11. A plurality of nodes, comprising:
a network interface card (NIC), wherein the NIC comprises a capability;
a NIC driver interfacing with the NIC, wherein the NIC driver is configured to store the capability of the NIC; and
a data link provider interface (DLPI) configured to interface the NIC driver with an operating system,
wherein the operating system is configured to:
request the capability of the NIC from the NIC driver,
receive a DLPI acknowledgement of the capability of the NIC from the NIC driver, wherein the DLPI acknowledgement is routed through the DLPI,
enable the capability of the NIC, and
establish, in response to the DLPI acknowledgement, a direct communication channel between the operating system and the NIC driver to use the capability of the NIC, wherein the direct communication channel bypasses the DLPI,
wherein the NIC resides on one of the plurality of nodes,
wherein the NIC driver resides on one of the plurality of nodes, and
wherein the operating system resides on one of the plurality of nodes,
wherein the operating system requests the capability of the NIC using a first DLPI request,
wherein enabling the operating system through the direct communication channel, to use the capability of the NIC comprises sending a second DLPI request to the NIC driver associated with the NIC,
wherein the DLPI acknowledgement comprises at least one interface associated with the capability, and
wherein the operating system is configured to use the capability through a function pointer provided in the interface.

* * * * *